United States Patent [19]

Grosse-Entrup

[11] Patent Number: 5,509,858
[45] Date of Patent: Apr. 23, 1996

[54] DRIVESHAFT WITH CLOSABLE MAINTENANCE APERTURE IN PROTECTIVE TUBES

[75] Inventor: Hubert Grosse-Entrup, Lohmar, Germany

[73] Assignee: GKN Walterscheid GmbH, Lohmar, Germany

[21] Appl. No.: 245,568

[22] Filed: May 19, 1994

[30] Foreign Application Priority Data

May 22, 1993 [DE] Germany .................... 43 17 167.2

[51] Int. Cl.$^6$ .................. A01B 71/08; F16P 1/00
[52] U.S. Cl. .................................................... 464/172
[58] Field of Search ............................ 464/162, 170, 464/172, 7; 74/607, 608, 609, 612, 613, 614; 403/50, 57; 180/346; 184/5

[56] References Cited

U.S. PATENT DOCUMENTS

| | | | |
|---|---|---|---|
| 3,113,441 | 12/1963 | Weasler | 464/172 |
| 3,618,340 | 11/1971 | Geisthoff et al. | 464/172 X |
| 4,696,660 | 9/1987 | Murphy et al. | 464/170 |
| 4,702,724 | 10/1987 | Vater | 464/172 |
| 5,173,082 | 12/1992 | Bondioli | 464/172 X |
| 5,366,043 | 11/1994 | Kretschmer et al. | 464/162 X |

FOREIGN PATENT DOCUMENTS 2101254  1/1983  United Kingdom.

Primary Examiner—Daniel P. Stodola
Assistant Examiner—William A. Rivera
Attorney, Agent, or Firm—Harness, Dickey & Pierce

[57] ABSTRACT

A driveshaft for driving agricultural machinery has two profiled tubes which are movable one inside the other and serve to transmit torque. Two protective tubes (5, 6) are provided which are also axially movable one inside the other. To be able to lubricate the profiled tubes, a maintenance aperture is provided which, at a certain driveshaft length, is obtained as a result of the overlapping position of two apertures (11, 12) in the protective tubes (5, 6). However, when not used, the aperture (11) in the outer protective tube (6) is covered by a closing sleeve (9). When extending the driveshaft after moving the closing sleeve (9), for the purpose of providing access to the apertures, the closing sleeve (9) is automatically returned into the closed position by a cam (13). This design measure results in a higher degree of safety by ensuring that the apertures are always closed when the driveshaft is in operation.

6 Claims, 4 Drawing Sheets

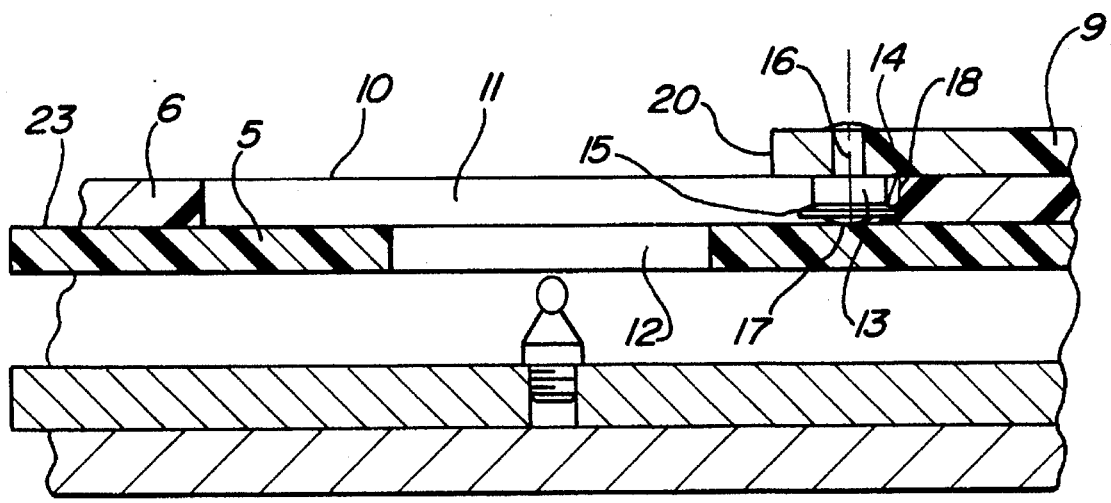
_Fig - 3_
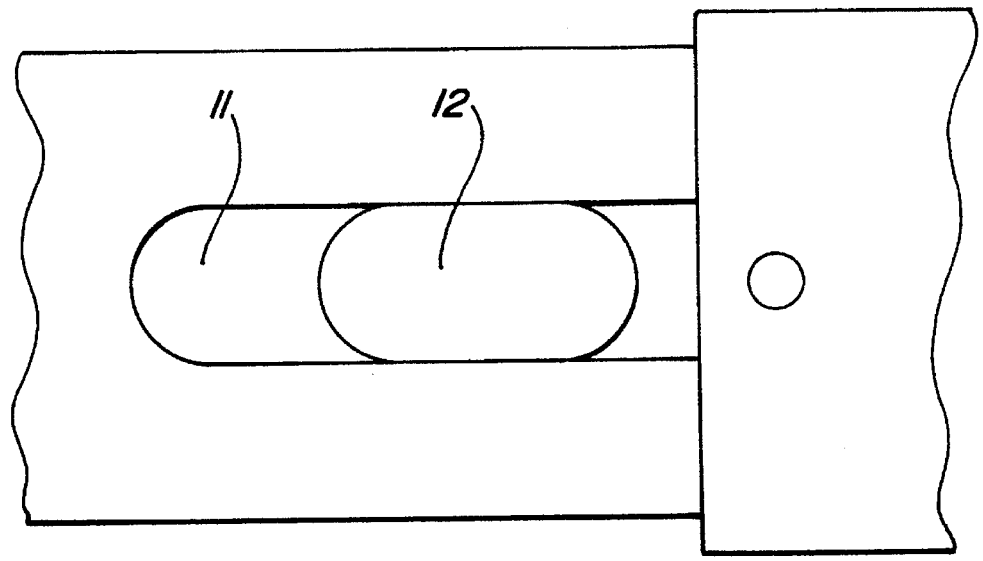
_Fig - 4_

DRIVESHAFT WITH CLOSABLE MAINTENANCE APERTURE IN PROTECTIVE TUBES

BACKGROUND OF THE INVENTION

The invention relates to a driveshaft, or drives of agricultural machinery, with two protective tubes arranged one inside the other which are axially movable and serve to cover the parts constituting the length adjusting mechanism.

In the case of driveshafts of the above-mentioned type, the plunging profiles serving to accommodate the axial movement between the two connecting ends, in the form of joints, are lubricated in order to reduce friction between them. For this purpose, it is common practice to pull the profiles fully apart and apply the lubricant.

SUMMARY OF THE INVENTION

It is an object of the invention to provide a driveshaft where it is possible to carry out the lubricating operation without dismantling the interengaging plunging profiles and protective tubes.

In accordance with the invention, the objective is achieved by the two protective tubes each including an aperture and, in the inserted position of the protective tubes, the apertures are in an overlapping position to form the maintenance aperture. A closing sleeve, with radial pretension, is positioned on the outer tube of the two protective tubes. Also, the closing sleeve, towards one of its two end faces, includes a radially inwardly projecting cam. The cam extends through the aperture in the outer protective tube which projects towards the inner protective tube. When in an overlapping position with the aperture of the inner protective tube, the cam extends radially into the aperture. When the apertures do not overlap, the cam is supported on the outer face of the inner protective tube in a friction-generating way.

By providing the closing sleeve with the cam, it is ensured that when the plunging profiles first carry out an adjusting movement relative to one another in the sense of increasing the distance between the two universal joints, the closing sleeve is automatically transferred into a closing position where it covers the aperture in the outer plunging profile. For safety reasons, it is essential for the maintenance aperture always to be closed in order to make it impossible to reach into the aperture when the shaft rotates.

When lubrication through the maintenance aperture becomes necessary, the disconnected or even connected driveshaft is moved towards the predetermined position of the two plunging profiles relative to one another. The apertures are uncovered by moving the closing sleeve manually. Lubrication may take place through the aperture. To ensure that, after the closing sleeve has been moved back by means of the cam or by hand, the closing sleeve remains in its position, it is proposed that the friction of the closing sleeve on the outer protective tube, due to the radial pretension, is greater than the friction of the cam on the outer face of the inner protective tube A particularly advantageous embodiment is obtained if, with a tube with respect to its inner and outer diameter is identical to the outer protective tube, the closing sleeve is formed by a tube portion which is provided with at least one slot starting from each end face. A closing sleeve weakened, so to speak, in this way, may be expanded with respect to its diameter and generate the necessary pretension relative to the outer face of the outer protective tube.

In a preferred embodiment, the apertures are provided in the form of oblong holes. The aperture in the outer protective tube is longer than the aperture in the inner protective tube. Thus, this ensures that the lubricating hole in the inner protective tube is easier to find.

To achieve the necessary friction locking effect of the cam relative to the outer face of the protective tube, the cam is provided with a supporting face which is curved towards the inner protective tube. To prevent the closing sleeve from moving out of the region of the aperture of the outer protective tube by its cam, the cam is provided with a cutting edge which cooperates with the wall of the outer protective tube. When the cam stops against the end of the aperture of the outer protective tube it prevents radial expansion. The cutting edge cuts into the wall of the outer protective tube.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment of the invention is diagrammatically illustrated in the drawing wherein:

FIG. 3 is an enlarged cross section of FIG. 1 along arrow X, with the driveshaft in the inserted position for the purpose of making the apertures in the protective tubes accessible, and with the closing sleeve in an axially displaced position.

FIG. 4 is a plan view according to FIG. 3.

DETAILED DESCRIPTION OF THE PREFERRED EMBODIMENTS

Figure 1:
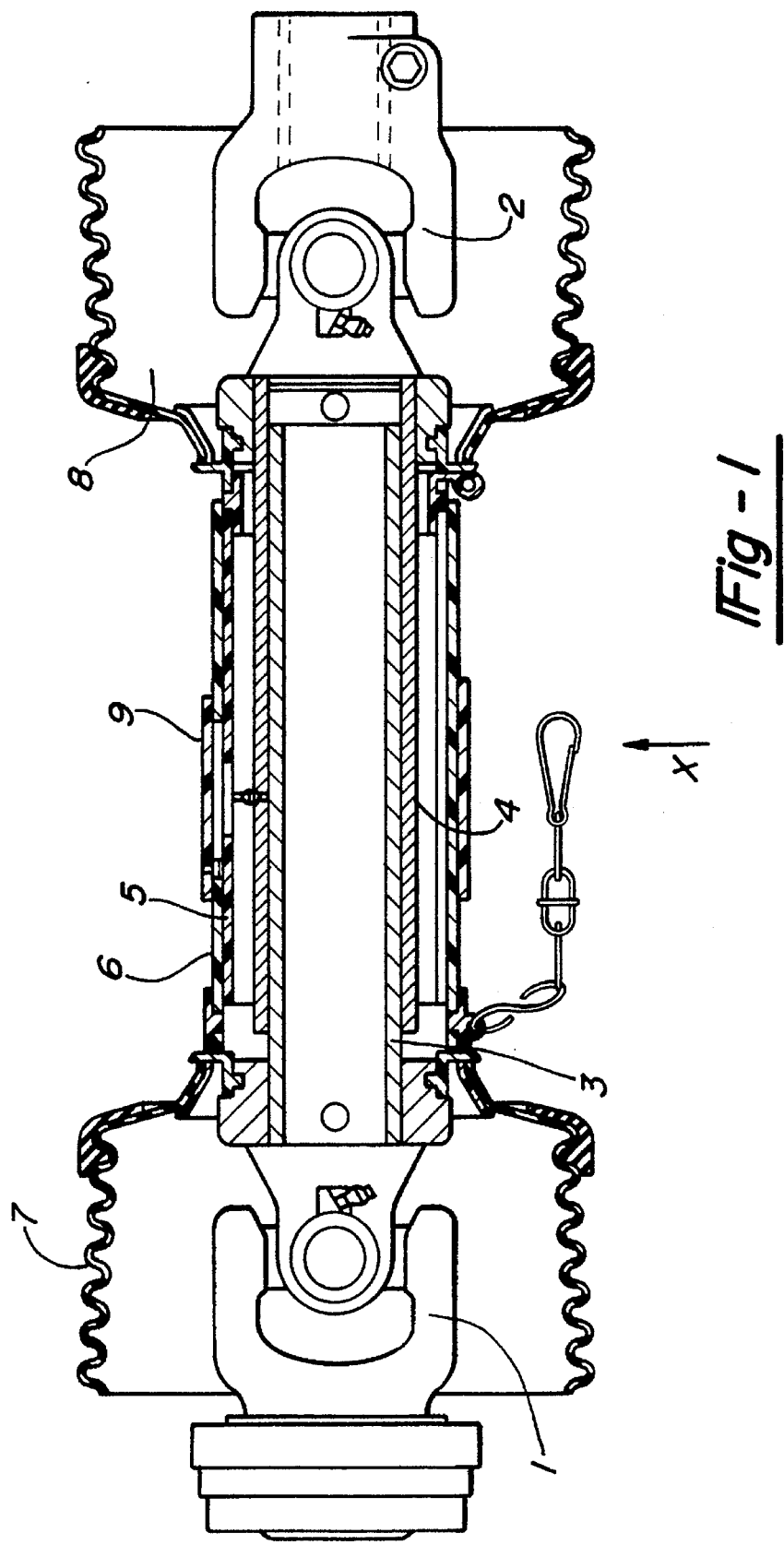
FIG. 1 is a cross sectional view of a driveshaft in accordance with the invention.
Figure 2:
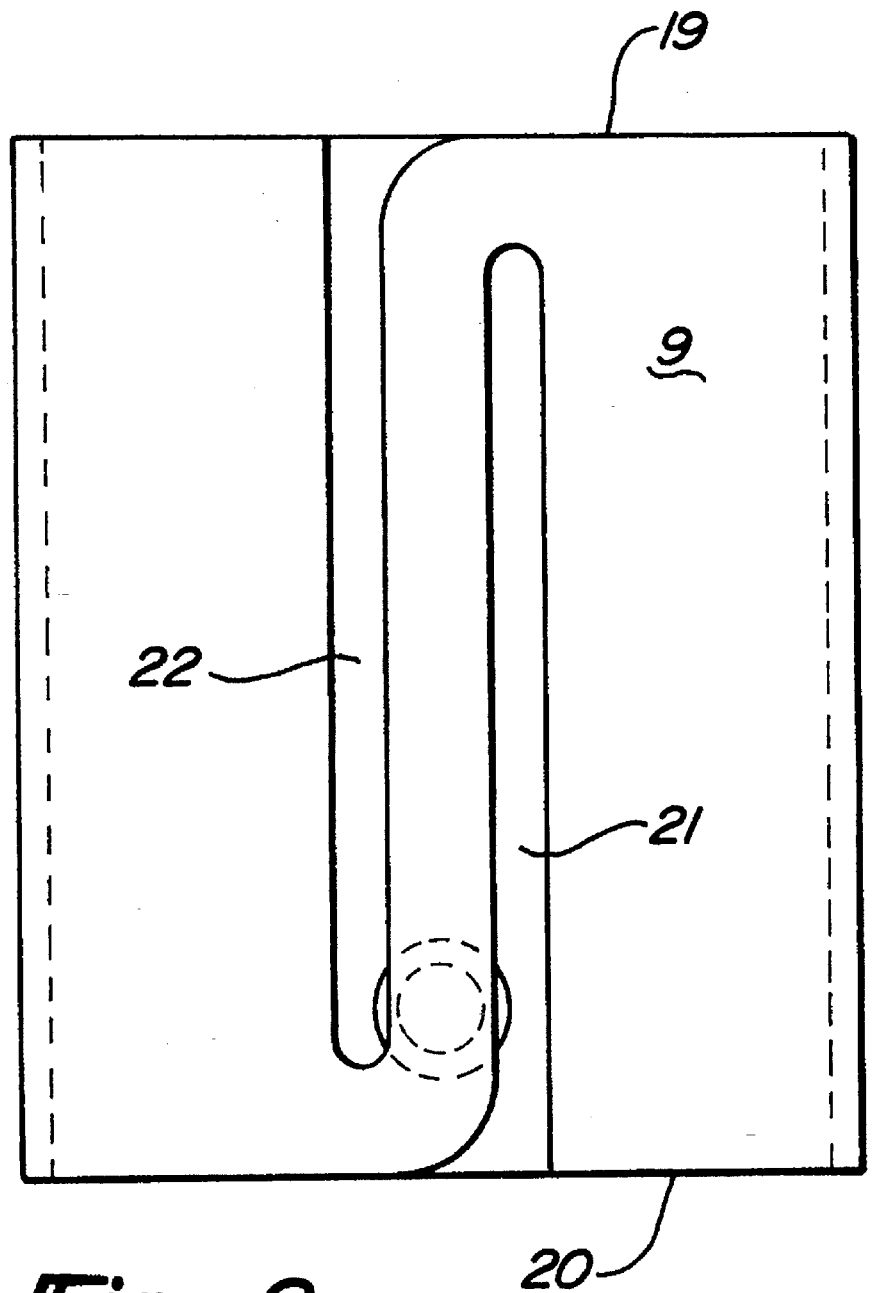
FIG. 2 is a plan view of a closing sleeve in the direction of arrow X.

The driveshaft illustrated in FIG. 1 includes the two universal joints 1, 2 one joint yoke of which serves to connect to a driving component or a component to be driven. The other joint yokes of the two universal joints 1, 2 are each connected to an inner profiled tube 3 and an outer profiled tube 4, respectively. An inner protective tube 5 and an outer protective tube 6 are arranged coaxially relative to the outer profiled tube 4 and the inner profiled tube 3. The former are rotatably supported on bearing portions associated with the profiled tubes 3, 4 or the adjoining joint yokes of the two universal joints 1, 2. They overlap in the axial direction, even if the two profiled tubes 3, 4 are in an extracted position. The two profiled tubes 3, 4 also overlap by a certain amount to transfer torque from one of the two universal joints to the other universal joint. In the course of the rotary movement of the driveshaft, changes in the positions of the connections of the two universal joints relative to one another may cause changes in length in the region of the profiled tubes 3, 4 by inserting the tubes into one another.

The two protective tubes 5, 6 also move axially relative to one another. The two protective tubes 5, 6 are connected to protective funnels 7, 8 which at least partially cover the two universal joints 1, 2. The two protective tubes 5, 6 and the protective funnels 7, 8 serve to protect people from rotating universal joints 1, 2 and rotating profiled tubes 3, 4. To be able to lubricate the two profiled tubes 3, 4, the two protective tubes 5, 6 are each provided with an aperture 11, 12, as illustrated in FIGS. 3, 4 and 5.

Under normal operating conditions, apertures 11, 12 are closed by a closing sleeve 9. The closing sleeve 9 is axially movably arranged on the outer face 10 of the outer protective tube 6. The closing sleeve 9 is held on the outer protective tube 6 by radial pretension. For this purpose, the closing sleeve 9 is produced from a tube which has the same dimensions as the outer protective tube 6. The sleeve constitutes a cylindrical tube portion, with slots 21, 22 starting from the two end faces 19, 20 thereof and ending in front of the respective other end face 20, 19. It is thus possible to expand the closing sleeve 9 radially to be able to slide it onto the outer face 10 of the outer protective tube 6.

Figure 5:
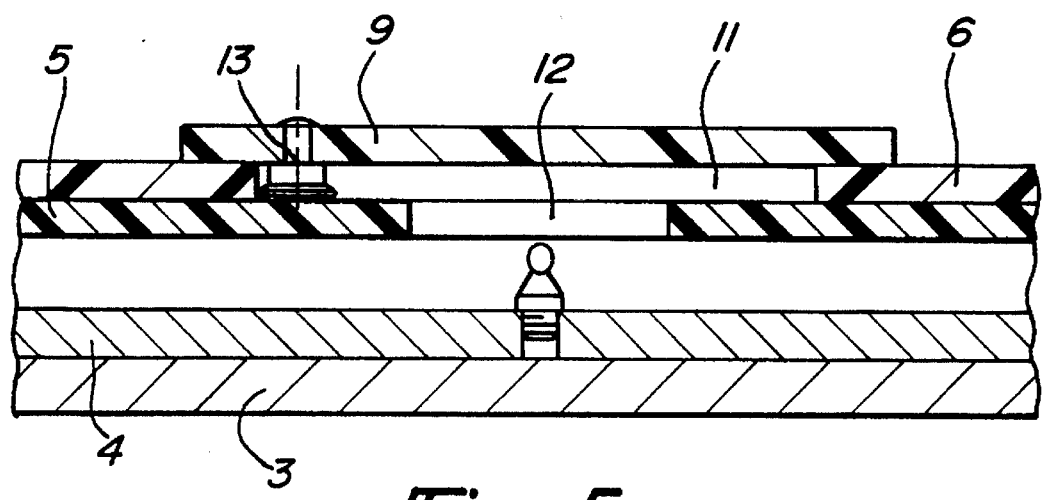
FIG. 5 is an enlarged sectional view similar to the illustration in FIG. 3, with the closing sleeve in the closing position.

As can be seen in FIGS. 3 to 5, the outer protective tube 6 is provided with a longitudinally extending aperture 11 having an oblong shape. The inner protective tube 5 is also provided with an oblong hole 12 constituting an aperture. The aperture 11 of the outer protective tube 6 is preferably longer than the aperture 12 of the inner protective tube 5. Towards its end face 20, the closing sleeve 9 is provided with a cam 13. The cam 13 constitutes a separate metal component, whereas the protective tubes 5, 6 and the closing sleeve 9 are of a plastic material.

The cam 13 is provided with a shank 16 by which it is secured by rivets, for example, in a radially extending bore in the closing sleeve 9. The cutting edge 15, arranged at a distance from the inner face of the closing sleeve 9, projects radially inwardly over the inner face of the closing sleeve beyond the diameter of the shank 16. The cutting edge 15 forms part of the collar 14. The outwardly curved supporting face 17 projects radially inwardly beyond the collar 14.

In the case of the condition as illustrated in FIGS. 3 and 4, the closing sleeve has been moved manually to such an extent that, at the end of the aperture 11 shaped like an oblong hole, in its position assumed after having been pushed towards the right, the cutting edge 15 contacts the wall 18 of the outer protective tube 6. The cutting edge 15 cuts into the wall 18 to prevent the closing sleeve 9 from moving any further towards the right. The projection, which includes the supporting face 17, extends radially inwardly towards the inner protective tube 5. On the lefthand side of the end face 20 of the closing sleeve 9, a free passage is provided through the overlapping apertures 11, 12 and thus access to the plunging profiles 3, 4. The two apertures 11, 12 in the protective tubes 5, 6 are arranged such that they are in the overlapping, position when the driveshaft assumes a predetermined, shortened position. After completion of the lubricating operation, the closing sleeve 9 may be moved to the left into the position as illustrated in FIG. 5, where it covers the aperture 11. If the operative manually forgets to close the closing sleeve 9, it is moved automatically upon the next occasion when the driveshaft is extracted.

When the inner protective tube 5 is moved to the left, starting from the position as illustrated in FIG. 3, the bearing face 17 will be moved off the outer face 23 of the inner guard tube 5 to abut either the righthand end wall of the aperture 12 or the innermost end wall of the guard tube 5. In either of these positions, or in intermediate positions therebetween, the aperture 12 will be occluded by the outer guard tube 6 although the closure sleeve 9 will still be at the righthand end of the aperture 11 with the aperture 11 open but out of its aligned overlap with the aperture 12. Subsequently, any movement of the inner guard tube 5 to the left will cause the closure sleeve 9 to be pushed to the left along the outer guard tube 6 to a position in which the aperture 11 is covered. This pushing of the closure sleeve 9 to the left is caused by abutment of either the righthand end wall of the aperture 12, or the end wall of the guard tube 5 as the case may be, against the bearing face 17 of the cam member 13 when the inner guard tube 5 moves to the left. The movement may continue until the cam 13 with its cutting edge 15 comes to rest against the lefthand end of the aperture 11. Upon a further relative movement between the outer protective tube 6 and the inner protective tube 5, in the sense of pulling the two tubes apart, the bearing face 17 slides onto the outer face 23 of the inner protective tube 9. As a result of the friction forces, the position of the closing sleeve 9 remains unchanged relative to the aperture 11.

While the above detailed description describes the preferred embodiment of the present invention, the invention is susceptible to modification, variation, and alteration without deviating from the scope and fair meaning of the subjoined claims.

I claim:

1. A driveshaft for agricultural machinery comprising:

two protective tubes arranged axially movable one inside the other and serving to cover length adjustable parts;

an aperture in each of said two protective tubes, and when the protective tubes are inside one another, said apertures are in an overlapping position to form a maintenance aperture;

a closing sleeve, with radial pretension, positioned on an outer tube of the two protective tubes, said closing sleeve, towards one of its two end faces, including a radially inwardly projecting cam which extends through the aperture in the outer protective tube, said cam projects towards the inner protective tube, which, when in an overlapping position with the aperture of the inner protective tube, said cam extends radially into said inner protective tube aperture and which, when said apertures do not overlap, said cam is supported on the outer face of the inner protective tube in a friction-generating manner.

2. The device according to claim 1, wherein due to said radial pretension of said closing sleeve, friction of the closing sleeve on the outer protective tube is greater than friction of the cam on the outer face of the inner protective tube.

3. The device according to claim 1, wherein said closing sleeve, with respect to its inner diameter and outer diameter, has the same dimensions equal to the outer protective tube and is provided with at least two adjoining slots starting from different end faces for providing said radial pretension.

4. The device according to claim 1, wherein the apertures are oblong holes and the aperture in the outer protective tube is longer than the aperture in the inner protective tube.

5. The device according to claim 1, wherein the cam includes a supporting face which is curved outwardly towards the outer face of the inner protective tube.

6. The device according to claim 1, wherein the cam includes a cutting edge for cutting into a wall of the outer protective tube when stopping against the end of the wall delimiting the aperture.

* * * * *